United States Patent
Davis et al.

(10) Patent No.: US 6,674,886 B2
(45) Date of Patent: *Jan. 6, 2004

(54) METHOD AND SYSTEM FOR RECOGNIZING SECURITY DOCUMENTS

(75) Inventors: Bruce L. Davis, Lake Oswego, OR (US); Burt W. Perry, Beaverton, OR (US); J. Scott Carr, Beaverton, OR (US); Gilbert B. Shaw, Portland, OR (US); Geoffrey B. Rhoads, West Linn, OR (US)

(73) Assignee: Digimarc Corporation, Tualatin, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/428,359

(22) Filed: Oct. 28, 1999

(65) Prior Publication Data

US 2003/0202677 A1 Oct. 30, 2003

Related U.S. Application Data

(62) Division of application No. 09/185,380, filed on Nov. 3, 1998, now Pat. No. 6,549,638.

(51) Int. Cl.$^7$ ................................................. G06K 9/00
(52) U.S. Cl. ..................................... 382/135; 340/5.86
(58) Field of Search ................................. 382/135, 137, 382/226, 281, 100; 340/5.2, 5.4, 5.8, 5.86; 356/71; 713/176

(56) References Cited

U.S. PATENT DOCUMENTS

| | | | |
|---|---|---|---|
| 3,069,654 A | 12/1962 | Hough | 340/146.3 |
| 4,769,850 A | 9/1988 | Itoh et al. | 382/25 |
| 4,908,873 A | 3/1990 | Philibert et al. | 382/34 |
| 5,220,621 A | 6/1993 | Saitoh | 382/22 |
| 5,481,377 A | 1/1996 | Udagawa et al. | 358/501 |
| 5,515,451 A * | 5/1996 | Tsuji et al. | 382/135 |
| 5,533,144 A | 7/1996 | Fan | 382/135 |
| 5,568,550 A | 10/1996 | Ur | 380/3 |
| 5,586,199 A | 12/1996 | Kanda et al. | 382/197 |
| 5,594,809 A | 1/1997 | Kopec et al. | 382/161 |
| 5,616,905 A | 4/1997 | Sugiyama | 235/456 |
| 5,629,990 A | 5/1997 | Tsuji et al. | 382/324 |
| 5,640,647 A | 6/1997 | Hube | 399/84 |
| 5,652,802 A * | 7/1997 | Graves et al. | 382/135 |
| 5,668,636 A | 9/1997 | Beach et al. | 358/296 |
| 5,678,155 A * | 10/1997 | Miyaza | 399/366 |
| 5,680,223 A | 10/1997 | Cooper et al. | 358/403 |
| 5,684,885 A | 11/1997 | Cass et al. | 382/100 |
| 5,689,620 A | 11/1997 | Kopec et al. | 395/20 |
| 5,706,364 A | 1/1998 | Kopec et al. | 382/159 |
| 5,710,636 A | 1/1998 | Curry | 358/298 |
| 5,796,869 A | 8/1998 | Tsuji et al. | 382/203 |
| 5,838,814 A * | 11/1998 | Moore | 382/115 |
| 5,862,260 A | 1/1999 | Rhoads | 382/232 |
| 5,870,495 A | 2/1999 | Mancuso et al. | 382/199 |
| 5,970,165 A * | 10/1999 | Itako | 382/135 |
| 6,091,844 A | 7/2000 | Fujii et al. | 382/135 |
| 6,181,813 B1 * | 1/2001 | Fan et al. | 382/135 |
| 6,188,787 B1 | 2/2001 | Ohmae et al. | 382/165 |
| 6,272,245 B1 | 8/2001 | Lin | 382/195 |
| 6,285,776 B1 | 9/2001 | Rhoads | 382/100 |
| 6,320,675 B1 | 11/2001 | Sakaki et al. | 358/1.9 |
| 6,345,104 B1 | 2/2002 | Rhoads | 382/100 |
| 2002/0054356 A1 | 5/2002 | Kurita et al. | 358/3.28 |

FOREIGN PATENT DOCUMENTS

| | | | |
|---|---|---|---|
| EP | 0789480 A2 | 8/1997 | H04N/1/00 |
| EP | 0649114 B1 | 2/2002 | G06K/9/68 |
| WO | WO95/04665 A1 | 2/1995 | B44F/1/12 |

OTHER PUBLICATIONS

Ballard, "Generalizing the Hough Transform to Detect Arbitrary Shapes," *Pattern Recognition*, vol. 13, No. 2, pp. 111–122, 1981.

Szepanski, "A Signal Theoretic Method for Creating Forgery–Proof Documents for Automatic Verification," Proceedings 1979 Carnahan Conference on Crime Countermeasures, May 16, 1979, pp. 101–109.

U.S. patent application Ser. No. 09/074,034, Rhoads, filed May 5, 1998.

U.S. patent application Ser. No. 09/127,502, Rhoads, filed Jul. 31, 1998.

U.S. patent application Ser. No. 09/185,380, Davis et al., filed Nov. 3, 1998.

U.S. patent application Ser. No. 09/287,940, Rhoads, filed Apr. 7, 1999.

U.S. patent application Ser. No. 09/293,601, Rhoads, filed Apr. 15, 1999.

U.S. patent application Ser. No. 09/293,602, Rhoads, filed Apr. 15, 1999.

(List continued on next page.)

*Primary Examiner*—Andrew W. Johns
(74) *Attorney, Agent, or Firm*—William Y. Conwell; Digimarc Corporation

(57) ABSTRACT

A document is analyzed to determine whether it is a banknote or the like, by reference to image data corresponding to the document. Two analysis techniques may be used, one based on detection of a visible pattern characteristic of a security document, the other based on detection of a steganographic digital watermark characteristic of a security document. If either characteristic is found, the image is flagged, and appropriate anti-counterfeiting steps may be taken. Detection of the visible pattern can be performed using a series of successively more rigorous tests. If the image fails a test, successive testing steps can be skipped, speeding the process. Hough transform-based pattern recognition techniques are used in some embodiments. Provision of both a visible pattern detector and a watermark detector in a single apparatus enhances detection reliability, while permitting various implementation efficiencies.

8 Claims, 2 Drawing Sheets

OTHER PUBLICATIONS

U.S. patent application Ser. No. 09/342,972, Rhoads, filed Jun. 29, 1999.

U.S. patent application Ser. No. 09/431,990, Rhoads, filed Nov. 3, 1999.

U.S. patent application Ser. No. 09/465,418, Rhoads et al., filed Dec. 16, 1999.

U.S. patent application Ser. No. 09/562,524, Carr et al., filed May 1, 2000.

U.S. patent application Ser. No. 09/761,280, Rhoads, filed Jan. 16, 2001.

U.S. patent application Ser. No. 09/761,349, Rhoads, filed Jan. 16, 2001.

U.S. patent application Ser. No. 09/765,102, Shaw, filed Jan. 17, 2001.

Gruhl et al., "Information Hiding to Foil the Casual Counterfeiter," *Data Hiding Workshop*, Apr. 15, 1998, 15 pages.

\* cited by examiner

METHOD AND SYSTEM FOR RECOGNIZING SECURITY DOCUMENTS

RELATED APPLICATION DATA

This application is a divisional application of application Ser. No. 09/185,380, filed Nov. 3, 1998, now U.S. Pat. No. 6,549,638, the disclosure of which is incorporated herein by reference.

BACKGROUND OF THE INVENTION

Various techniques have been employed over the years to discourage use of conventional office equipment (e.g., color photocopiers) for counterfeiting of banknotes and similar financial instruments. One technique is to equip photocopiers with the capability to recognize banknotes documents and, upon such recognition, disable or impair copying.

While such approaches offer some deterrence against counterfeiting, they suffer from various drawbacks and limitations. The present invention seeks, through its various embodiments, to redress certain of these drawbacks and to provide additional functionality not previously available.

The foregoing and additional features and advantages of the present invention will be more readily apparent from the following detailed description, which proceeds with reference to the accompanying drawings.

DETAILED DESCRIPTION

Figure 1:
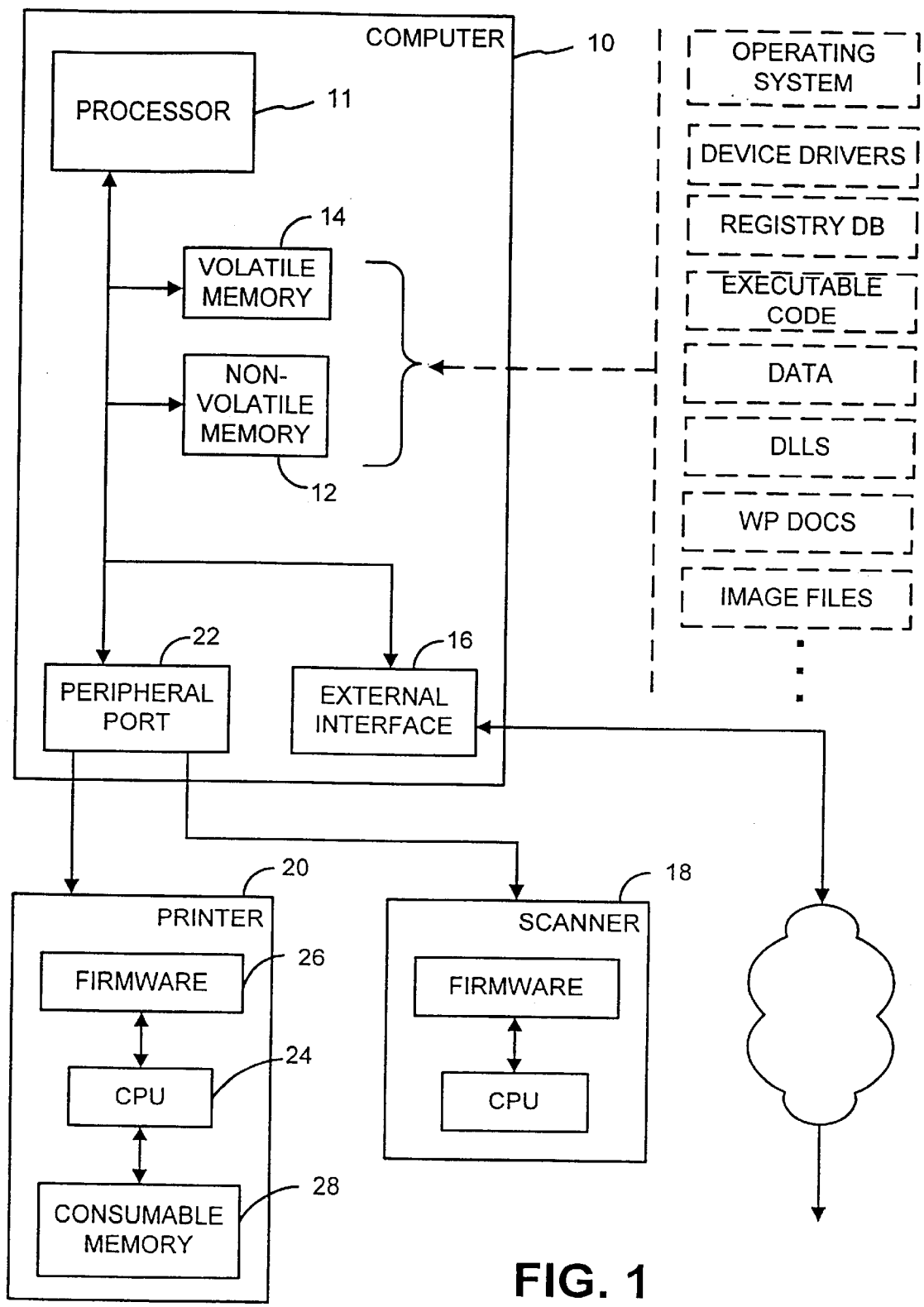
FIG. 1 is a diagram of a computer system according to one embodiment of the present invention.

Referring to FIG. 1, a computer system 10 employed in one embodiment of the present invention includes a processor 11, a non-volatile store 12, volatile memory 14, an external interface 16, and various peripherals (e.g. a scanner 18, a printer 20, etc.).

The processor 11 typically comprises a CPU, such as one of the microprocessors available from Intel, Sun, AMD, Cyrix, Motorola, MIPS, etc. Alternatively, the processor can take other forms, including hardwired logic circuitry, programmable logic (e.g. FPGAs), or yet-to-be-devised processing arrangements.

The non-volatile store 12 typically comprises a magnetic disk, but can also include other writeable media, including optical disks, flash memory, EEPROMS, ROMBIOS, etc. The non-volatile store can be physically located with the processor 11 (e.g. hard disk, CMOS memory with system setup data, etc), and/or can be remote (e.g. a networked drive, storage accessible over the Internet, etc.).

The volatile memory 14 typically comprises RAM, either integrated with the CPU (e.g. cache), and/or separate.

The external interface 16 can take various forms, including a modem, a network interface, a USB port, etc. Any link to a remote resource other than common peripherals is generally considered to employ an external interface.

Stored in the non-volatile store 12 is various software. This includes operating system software, applications software, and various user files (word processing documents, image files, etc.). The operating system software typically includes a thousand or more files, including a registry database (detailing the resources available in the system, etc.) and various device drivers (which serve as software interfaces between the CPU and peripheral devices, such as scanner 18 and printer 20). The applications software includes executable code and data. Both the operating system software and the applications software may employ shared files (e.g. DLLs) which can be utilized by different executables and/or operating system components to provide desired functionality.

While illustrated as resident in the non-volatile store 12, the foregoing software is generally loaded into the volatile memory 14 for execution.

The peripherals 18, 20 are typically connected to the computer system through a port 22 (e.g. serial, parallel, USB, SCSI, etc.) which permits bi-directional data exchange. Each peripheral typically includes its own processor circuitry 24 that operates in conjunction with firmware 26 (software resident in memory within the printer) to perform peripheral-specific processing and control functions. In addition to the memory in which the firmware is stored (e.g. EEPROM, flash memory, etc.), some peripherals have other data storage. For example, the disposable "consumables" in printers increasingly include their own non-volatile memories 28 in which various calibration and/or usage data is stored.

In one embodiment of the present invention, the computer system writes forensic tracer data (sometimes termed an "audit trail") to a non-volatile store if it detects a possibly illicit action, e.g. the processing of image data corresponding to a banknote. (For expository convenience, the term "banknote" is used to refer to all manner of value documents, including paper currency, travelers checks, money orders, stamps, university transcripts, stock certificates, passports, visas, concert- or sporting event tickets, etc.) The data is written in a manner(s), and/or to a location(s), chosen to minimize its possible detection by a cautious perpetrator. If the computer is later inspected pursuant to a lawful search and seizure, it can be analyzed for the presence of incriminating tracer data.

There is considerable prior work in the field of detecting security documents from image data. Published European application EP 649,114, for example, describes banknote detection techniques based on the use of fuzzy inferencing to detect geometrical arrays of certain patterns (sometimes termed "visible structures") that are characteristic of banknotes. U.S. Pat. Nos. 5,515,451, 5,533,144, 5,629,990, and 5,796,869 describe banknote detection techniques based on different pattern matching techniques (e.g. to recognize the Federal Reserve seal). Xerox has also proposed its data glyph technology (detailed, e.g., in U.S. Pat. Nos. 5,706,364, 5,689,620, 5,684,885, 5,680,223, 5,668,636, 5,640,647, 5,594,809) as a means to mark security documents for later machine-identification.

Another means for detecting security documents is by use of Hough-based pattern matching techniques as described, e.g., in Hough's U.S. Pat. No. 3,069,654, and Ballard, "Generalizing the Hough Transform to Detect Arbitrary Shapes," Pattern Recognition, Vol. 13, No. 2, pp. 111–122, 1981. One embodiment of such a system follows the approach outlined in the Ballard paper, and employs plural tables corresponding to different patterns found on banknotes, with different confidence. Gross Hough-based processing is first performed using one or more rotationally-invariant features (e.g. U.S. Federal Reserve Seal) to quickly identify most image sets as not banknote-related. Any data that looks to be potentially bank-note related after the first check is subjected to successively more selective, higher-confidence tests (some stepping through plural rotational states) to weed out more and more non-banknote image sets. Finally, any image data passing all the screens is concluded to be, to a very high degree of certainty, a banknote. An appropriate signal is then generated (e.g. a change in state of a binary signal) to indicate detection of a banknote.

Neural networks and algorithms are also suitable for detection of patterns characteristic of banknotes, as illustrated by European patent EP 731,961, etc.

In the present assignee's prior applications (e.g. Ser. No. 08/649,419, now U.S. Pat. No. 5,862,260; Ser. No. 09/074,034, now U.S. Pat. No. 6,449,377; Ser. No. 09/127,502, now U.S. Pat. No. 6,345,104; and No. 60/082,228) techniques are disclosed for marking security documents with generally imperceptible, or steganographic, watermark data, so as to facilitate later identification of such documents. By employing digital watermark-based banknote detection in combination with visible feature-based banknote detection, very high confidence recognition of banknote data can be achieved.

The artisan is presumed to be familiar with the various approaches for recognizing banknotes from image data, of which the foregoing is just a sampling.

While such banknote-detection techniques are commonly implemented in resource-intensive form, using sophisticated processing units (e.g. the main CPU of a copier), this need not be the case. To reduce the resource requirements, the detection algorithm can be tailored to operate on parts of scan-line data, without buffering the entire set of image data for analysis. The algorithm can be implemented on less-sophisticated processors, such as those used in the scanner 18 or the printer 20. The processors can be programmed, by appropriate firmware, to perform such processing on any image data scanned by, or printed by, such devices. And as modems and other interfaces (SCSI, FireWire, IDE, ATAPI, etc.) continue their evolution from dedicated hardware to software-based implementations, their data processing capabilities increase commensurately. Thus, for example, software-implemented modems, network interfaces, UARTs, etc., can monitor the data traffic passing therethrough and flag any that appears to be banknote-related. The full analysis operation can be performed by the interface, or the data can be copied and passed to the main processor for further analysis.

In the preferred embodiment of the present invention, when banknote image data is detected, storage of forensic data is triggered. The forensic data typically includes at least the date (and optionally the time) at which the possibly illicit action occurred. Additionally, the forensic data can include the file name of the banknote image data (if available), and a code indicating the nature of the event noted (e.g., banknote data detected by the printer; banknote data detected passing through the modem on COM2; banknote data detected written to removable media having volume ID 01FF38; banknote data detected in file opened by Adobe Photoshop, etc.) The forensic data can additionally detail the source from which the data came, and/or the destination to which it was sent (e.g. IP/email addresses). In operating systems requiring user login, the stored forensic data will typically include the use ID. System status data can also be included, e.g. identifying peripheral devices attached to the system, code loaded into RAM memory, the amount of time the user spent working on the illicit data, etc. Selected data from any operating system registry database (e.g. identifying the registered owner of certain applications software then-loaded on the computer, software serial numbers, operational parameters, etc.) can likewise be included. If the computer is on a network or on the Internet, the network address, Ethernet MAC address, AppleTalk name and zone, TraceRoute information, or IP address information can be stored. If the illicit action has been detected by reference to a watermark or other embedded data, payload data recovered from the watermark can be included in the forensic tracer data.

On one extreme, the foregoing (and possibly more) information can be stored in detailed forensic tracer records. At the other extreme, the forensic tracer record can comprise a single bit indicating that the computer system has been used—at least once—for a possibly illicit action.

Expecting that savvy counterfeiters will attempt to defeat such forensic tracer data, such data is desirably generated, transmitted, and stored redundantly, transparently, and inconspicuously.

Figure 2:
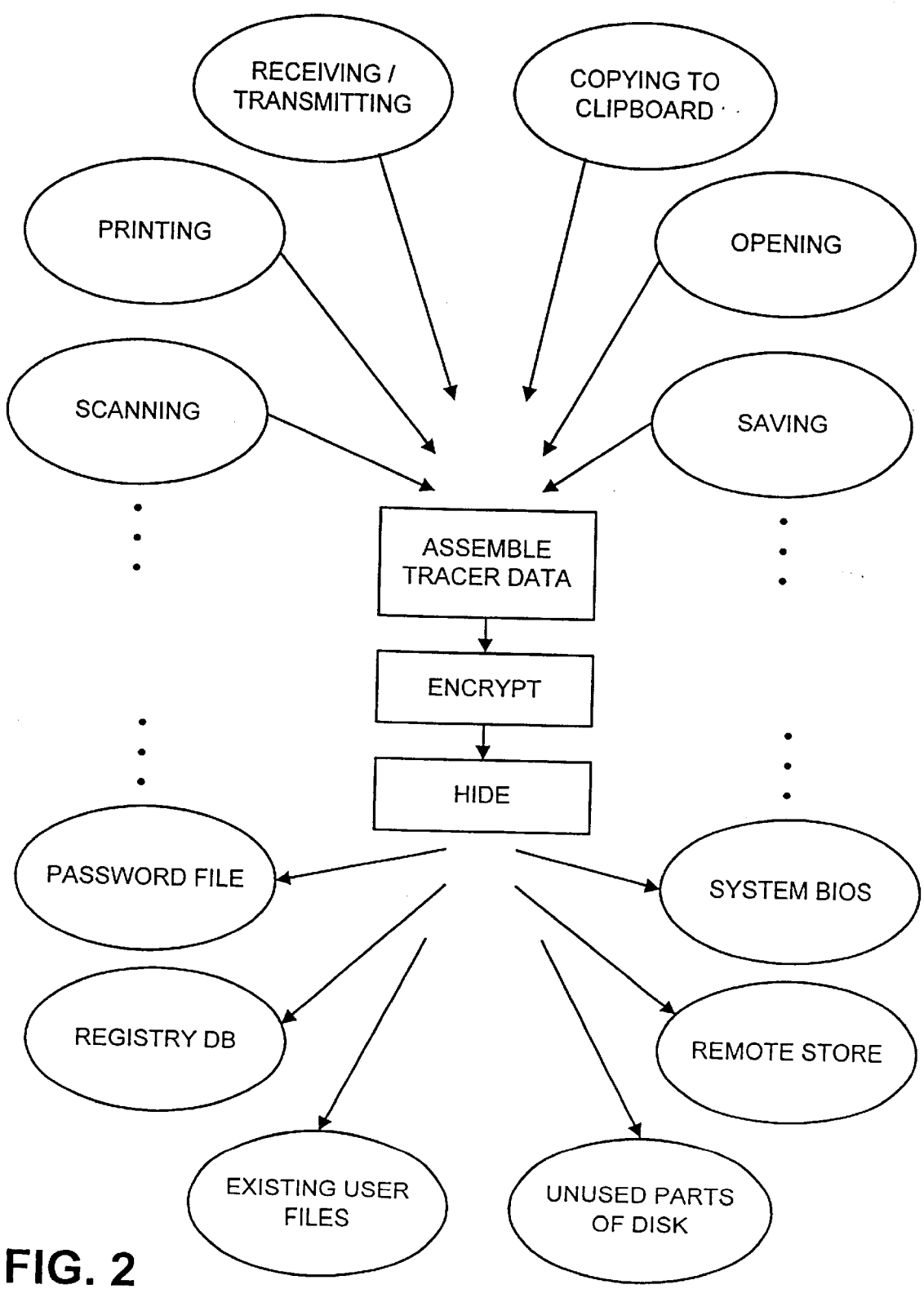
FIG. 2 is a diagram illustrating certain of the principles used in the FIG. 1 embodiment.

Redundant generation of the tracer data refers to detection of possibly illicit activity at various points in the computer system, and/or during various operations. Referring to FIG. 2, possibly illicit activity can be detected, e.g., during scanning of an image, printing of a document, receiving or transmitting a file through a modem connection, opening a file with an application program, saving a file with an application program, copying data to a clipboard, etc. By providing multiple opportunities for detection of possibly illicit activities, the robustness of the system is increased.

Redundant transmission of the tracer data refers to its transmission to storage media several times. When a possibly illicit activity is detected, it desirable to send tracer data to storage both immediately and on a delayed basis (e.g. five minutes after detection of banknote data, and every two minutes thereafter for a period of M minutes). By sending the data to storage repeatedly, the robustness of the system is again increased.

Redundant storage of the tracer data refers to its storage at several different locations (simultaneously or sequentially).

If even one instance of the redundantly generated/transmitted/stored tracer data survives the counterfeiter's attempts to redact incriminating data, it will be useful evidence in any prosecution.

Transparent generation/transmission/storage means that the acts associated with these operations will not arouse the counterfeiter's suspicion.

Various software tools are available to trace program execution. A savvy counterfeiter may employ such tools to monitor all disk writes performed by his system. Consider, for example, a counterfeiter using an image processing program in aid of his counterfeiting. The person may monitor the sequence of files opened and closed (and/or the data read/written) during use of the program for image processing with non-bank note data, and then be suspicious if different files, or in different orders, are opened and closed when performing the same image processing operations on banknote data. Thus, at least some of the forensic data should be stored using routine operations and routine files (e.g. writes to files that are used during normal program execution). Of course, such tracer data should be written in a manner assuring that the data will persist—either in the location originally written, or by copying during subsequent machine operation (e.g. on closing the application program, shutting down the operating system, etc.) to a location assuring longer-term availability.

Program-tracing tools typically monitor just the computer's main CPU so—where possible—at least some of the tracer data should be stored under the control of a different processing element, or in a location to which the tool's capabilities do not extend. Another option is to keep at least some of the tracer data in RAM memory for a period after the illicit action has been detected, and store it later.

Yet another option is to store at least some forensic tracer records in the operating system registry database. This resource is commonly accessed during system operation, so references to the database may not give rise to suspicion.

Inconspicuous storage covers a wide range of options. One is that the data be encrypted. This assures that simple disk-scanning operations attempting to find byte strings likely associated with tracer data will be unsuccessful. (Numerous encryption techniques are known, e.g. RSA, PGP, various private key techniques, etc., any of which can be used.)

Encrypted tracer data can be stored with other encrypted system data, such as in a password file. Due to its encrypted nature, a hacker may not be able to discern what part of the stored data is tracer data and what part is, e.g., password data. Attempts to redact the tracer data risks corrupting the password data, jeopardizing the counterfeiter's later ability to login to the machine.

Another possibility is to steganographically encode the tracer data, e.g. by randomizing/obfuscating same and inconspicuously hiding it amidst other data (e.g. within graphic or audio files associated with start-up or shut-down of the computer operating system, or wherever else noise-like data can be introduced without alerting the user to its presence). Still another possibility is to create null code that resembles normal instructions or data, but instead serves as a forensic tracer record.

To avoid creation of telltale new files in the non-volatile memory, the tracer data can be patched into existing files, by appending to the end or otherwise. Or, rather than storing the tracer data as the content of a file, the data can be stored among a file's "properties."

Another way to avoid creating new files is to avoid using the computer's "file system" altogether, and instead use low-level programming to effect direct writes to typically-unused or reserved physical areas on the disk. By such techniques, the data is resident on the disk, but does not appear in any directory listing. (While such data may be lost if disk optimization tools are subsequently used, those skilled in the art will recognize that steps can be taken to minimize such risks.)

Yet another way to avoid creating new files is to relay at least some of the tracer data to outside the computer. One expedient is to use an external interface to transmit the data for remote storage. Again, a great variety of techniques can be employed to reliably, yet effectively, effect such transmission. And the data transmission need not occur at the moment the possibly illicit action is occurring. Instead, such data can be queued and relayed away from the machine at a later time.

Still another way to avoid creating new files is to make use of deadwood files that commonly exist on most computers. For example, application programs typically employ installation utilities which copy compressed files onto the disk, together with code to decompress and install the software. These compressed files and installation programs are usually not deleted, providing opportunities for their use as repositories of tracer data. Similarly, many computers include dozens or hundreds of duplicate files—only one of which is commonly used. By converting one or more of these files to use as a repository for tracer data, additional inconspicuous storage can be achieved.

Some application programs include hundreds of files, various of which are provided just for the occasional use of the rare super-user. Files that pass some litmus test of inactivity (e.g. not ever used, or not accessed for at least two years) might serve as tracer data repositories. (Disk utilities are available to determine when a given file was last accessed.) Yet another option is to append data to an application's Help files, or other binary data files used to save program state information for the application.

Resort may also be made to various of the known techniques employed in computer viruses to generate, transmit, store and disseminate/replicate the forensic tracer data in manners that escape common detection. Moreover, such virus techniques can be used to initially spread and install the functionality detailed above (i.e. pattern recognition, and tracer data generation/transmission/storage) onto computers without such capabilities.

Some embodiments may perform self-integrity checks of old tracer records each time a new banknote is encountered, and repair any damage encountered. Similarly, old tracer records can be expanded to detail new illicit acts, in addition to (or in lieu of) creating independent records for each illicit act.

Various tools can be used to replicate/propagate forensic tracer records to further infest the system with incriminating evidence. Utility software such as disk defragmenters, disk integrity checks, virus checkers, and other periodically-executed system maintenance tools can be written/patched to look in some of the places where forensic tracer records may be found and, if any are encountered, copy them to additional locations. Similar operations can be performed upon termination of selected application programs (e.g. image processing programs).

The foregoing is just the tip of the iceberg. Those skilled in the arts of computer programming, operating system design, disk utilities, peripheral firmware development, packet data transport, data compression, etc., etc., will each recognize many different opportunities that might be exploited to effect surreptitious, reliable banknote detection, and transmission, storage, and/or replication of tracer data. Again, if even one tracer record persists when the computer is searched by suitably-authorized law enforcement officials, incriminating evidence may be obtained. The high odds against ridding a computer of all incriminating data should serve as a deterrent against the computer's use for illegal purposes in the first place.

As noted, the computer system desirably includes several checkpoints for detecting illicit actions. In the case of banknote image processing, for example, detectors can be implemented in some or all of the following: in image processing software applications, in DLLs commonly used with image processing, in printer drivers, in printer firmware, in scanner drivers, in scanner firmware, in modem or other external interface drivers and software, in email software, in FTP software, in the operating system (looking at the clipboard, etc.), etc., etc. Similarly, where practical, the checking should be done by several different processors (e.g. main CPU, programmable interface chips, scanner microcontroller, printer microprocessor, etc.).

From the foregoing, it will be recognized that techniques according to the present invention can be used to discourage counterfeiting, and to aid in its prosecution when encountered. Moreover, this approach obviates the prior art approach of marking all color photocopies with tracer data, with its accompanying privacy and first amendment entanglements.

Having described and illustrated the principles of our invention with reference to an illustrative embodiment and several variations thereon, it should be recognized that the invention can be modified in arrangement and detail without departing from such principles.

For example, while the detailed embodiment has focused on a computer system, the same techniques can likewise be employed in stand-alone color copiers, etc.

Similarly, while the detailed embodiment has focused on counterfeiting, it will be recognized that computers can be employed in various other illicit or unauthorized activities. Each generally is susceptible to computer-detection (e.g. threats against the president may be detected by specialized natural language analysis programs; computer-aided synthesis of illegal drugs may be indicated by certain chemical modeling instructions in software specific to that industry; unauthorized duplication of copyrighted works may be flagged by the presence of embedded watermark data in the copyrighted work; unauthorized distribution of classified or confidential business documents may be detected using known techniques, etc.). The storage of forensic tracer data along the lines detailed above is equally applicable in such other contexts.

In the future, support for illicit activity detection may be routinely provided in a wide variety of software and peripherals. In one embodiment, the software and peripherals may include generic services supporting the compilation of forensic tracer data, its encryption, transmission, storage, etc. These generic services can be invoked by detector modules that are customized to the particular illicit/unauthorized activity of concern. Some of the detector modules can be fairly generic too, e.g. generic pattern recognition or watermark detection services. These can be customized by data loaded into the computer (either at manufacture, or surreptitiously accompanying new or updated software) identifying particular images whose reproduction is unauthorized/illicit. As new banknotes are issued, updated customization data can be distributed. (Naturally, such detector customization data will need to be loaded and stored in a manner that is resistant against attack, e.g. using the approaches outlined above for the covert tracer data.)

While the invention is described in the context of an end-user computer, the principles are equally applicable in other contexts, e.g. in server computers. Moreover, the principles are not limited to use in general purpose personal computers but can also be applied in other computer devices, e.g. digital cameras, personal digital assistants, set-top boxes, handheld devices, firewalls, routers, etc.

Although not belabored above, it will be understood that law enforcement agencies will have software recovery tools that can be employed on suspect computer systems to recover whatever forensic tracer data may persist. Briefly, such tools know where to look for tracer data and, when encountered, know how to interpret the stored records. After analyzing the non-volatile stores associated with a suspect computer system, the recovery software will report the results. The implementation of such tools is well within the capabilities of an artisan.

While the foregoing disclosure has focused exclusively on the storage of forensic tracer data as the response to a possibly-illicit action, more typically this is just one of several responses that would occur. Others are detailed in the previously-referenced documents (e.g. disabling output, hiding tracer data (e.g. as in U.S. Pat. No. 5,557,742, or using steganographically encoded digital watermark data) in the output, telephoning law enforcement officials, etc.).

To provide a comprehensive disclosure without unduly lengthening this specification, applicants incorporate by reference the patent applications and documents referenced above. By so doing, applicants mean to teach that the systems, elements, and methods taught in such documents find application in combination with the techniques disclosed herein. The particular implementation details of such combinations are not belabored here, being within the skill of the routineer in the relevant arts.

In view of the many possible embodiments in which the principles of our invention may be realized, it should be recognized that the detailed embodiments are illustrative only and should not be taken as limiting the scope of our invention. Rather, we claim as our invention all such modifications, combinations, and implementations as may come within the scope and spirit of the following claims, and equivalents thereof.

We claim:

1. A method of processing image data to screen for security document images comprising, in the order stated:

(a) performing a first analysis on the image data;

(b) if the first analysis indicates the image data does not correspond to a security document, skipping steps (c)–(e)

(c) performing a second analysis on the image data;

(d) if the second image analysis indicates the image data does not correspond to a security document, skipping step (e); and (e) flagging the image data as corresponding to a security document;

wherein at least one of the analyses employs a Hough-based transform to detect a two-dimensional, rotationally invariant feature.

2. The method of claim 1 wherein the image data is acquired by visible light scanning.

3. The method of claim 1 in which one of the analyses employs a Hough-based transform to detect a two-dimensional, rotationally invariant feature at a first rotational state, and another of the analyses employs a Hough-based transform to detect a two-dimensional, rotationally invariant feature at a second, different, rotational state.

4. A method of processing image data to screen for security document images comprising, in the order stated:

(a) performing a first analysis on the image data;

(b) if the first analysis indicates the image data does not correspond to a security document, skipping steps (c)–(e)

(c) performing a second analysis on the image data;

(d) if the second image analysis indicates the image data does not correspond to a security document, skipping step (e); and (e) flagging the image data as corresponding to a security document;

wherein the first analysis is based on a rotationally invariant feature.

5. The method of claim 4 wherein the image data is acquired by visible light scanning.

6. A method of processing image data to screen for security document images comprising, in the order stated:

(a) performing a first analysis on the image data;

(b) if the first analysis indicates the image data does not correspond to a security document, skipping steps (c)–(e)

(c) performing a second analysis on the image data;

(d) if the second image analysis indicates the image data does not correspond to a security document, skipping step (e); and (e) flagging the image data as corresponding to a security document;

wherein the first analysis is based on a rotationally symmetric feature.

7. The method of claim 6 wherein the image data is acquired by visible light scanning.

8. A method of processing image data to screen for security document images comprising, in the order stated:

(a) performing a first analysis on the image data;

(b) if the first analysis indicates the image data does not correspond to a security document, skipping steps (c)–(e)

(c) performing a second analysis on the image data;

(d) if the second image analysis indicates the image data does not correspond to a security document, skipping step (e); and (e) flagging the image data as corresponding to a security document;

wherein one of said analyses steps through plural rotation states of the image data.

* * * * *